US006661976B1

(12) United States Patent
Gnauck et al.

(10) Patent No.: US 6,661,976 B1
(45) Date of Patent: Dec. 9, 2003

(54) METHOD AND SYSTEM FOR SINGLE-SIDEBAND OPTICAL SIGNAL GENERATION AND TRANSMISSION

(75) Inventors: Alan H. Gnauck, Middletown, NJ (US); Cedric F. Lam, Middletown, NJ (US); Sheryl Leigh Woodward, Holmdel, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/477,816

(22) Filed: Jan. 5, 2000

(51) Int. Cl.[7] .............................................. H04B 10/04
(52) U.S. Cl. ........................ 398/183; 398/185; 375/301
(58) Field of Search ................................ 359/181, 183, 359/188; 398/183, 185; 375/270, 301, 321

(56) References Cited

U.S. PATENT DOCUMENTS

| | | | | |
|---|---|---|---|---|
| 5,301,058 A | * | 4/1994 | Olshansky | 359/181 |
| 5,539,846 A | * | 7/1996 | Morikura et al. | 359/110 |
| 5,880,870 A | * | 3/1999 | Sieben et al. | 359/181 |
| 5,999,300 A | * | 12/1999 | Davies et al. | 359/181 |
| 6,404,535 B1 | * | 6/2002 | Leight | 359/306 |
| 6,426,947 B1 | * | 7/2002 | Banker et al. | 370/254 |
| 6,441,935 B1 | * | 8/2002 | Araki et al. | 359/139 |
| 6,452,975 B1 | * | 9/2002 | Hannah | 375/257 |

OTHER PUBLICATIONS

Shimotsu et al., "LiNbO3 Optical Single–Sideband Modulator", OFC 2000, PD 16–1–16–4, Mar. 2000.
Conradi et al., "Optical Single Sideband (OSSB) Transmission for Dispersion Avoidance and Electrical Dispersion Compensation in Microwave Subcarrier and Baseband Digital Systems", OFC '97, PD29–1–29–4, Feb. 1997.
Koyama et al., "Frequency Chirping in External Modulators", Journal of Lightwave Technology, vol. 6, No. 1, Jan. 1988, pp. 87–93.
Sieben et al., "Optical Single Sideband Transmission at 10 Gb/s Using Only Electrical Dispersion Compensation", Journal of Lightwave Technology, vol. 17, No. 10, Oct. 1999, pp1742–49.
Smith et al., "Technique for Optical SSB Generation to Overcome Dispersion Penalities in Fibre–radio Systems", Electronics Letters, vol. 33, No. 1, Jan. 1997, pp. 74–75.
Sieben et al. "10 Gbit/s Optical Single Sideband System", Electronics Letters, vol. 33, No. 11, May 1997, pp. 971–973.
Frankel et al., "Optical Single–Sideband Suppressed–Carrier Modulator for Wide–Band Signal Processing", Journal of Lightwave Technology, vol. 16, No. 5, May 1998, pp. 859–863.

* cited by examiner

Primary Examiner—Leslie Pascal
Assistant Examiner—Christina Y Leung (57) ABSTRACT

A method and system for generating and transmitting optical signals with only one sideband. Single-sideband optical signal transmission reduces the signal impairment effects associated with dispersion. Such transmission also increases the spectral efficiency of optical transmission systems. Single-sideband modulation also makes possible electrical compensation for optical link dispersion during transmission. Single-sideband modulation is generated using the modulating data signal and its Hilbert transform, which is approximated by a tapped-delay time filter. Line coding is used to remove the low-frequency content in the modulating data signal, avoiding the inefficiencies of tapped-delay-line filter approximated Hilbert transformers at low frequencies. Line coding can also help optical single side band signal generation and transmission using a simple optical filter instead of Hilbert transformers.

10 Claims, 11 Drawing Sheets

METHOD AND SYSTEM FOR SINGLE-SIDEBAND OPTICAL SIGNAL GENERATION AND TRANSMISSION

BACKGROUND OF THE INVENTION

1. Field of Invention

This invention relates to a method and system for optical single-sideband data generation and transmission.

2. Description of Related Art

The ability of the Mach-Zehnder (MZ) intensity modulator to control both intensity and optical frequency has been demonstrated to improve the performance of long-haul fiber-optic systems such as those used by the telecommunications industry. See, F. Koyama and K. Iga, "Frequency chirping in external modulators," Journal of Lighwave Technology, Vol. 6, pp. 87–93, 1988. In addition, the use of high-power diode-pumped YAG lasers operating at 1300 nano-meters (nm) and MZ external intensity modulators based on $LiNbO_3$ has found wide application in the cable TV (CATV) industry.

Conventionally, optical transmission systems may use either direct or external modulation of a laser. Ideally, the intensity of the light output from a modulated laser should be linearly proportional to the injected current, and the frequency of the optical carrier should be minimally influenced. However, modulation of the optical frequency occurs when a laser is directly modulated. For example, a data signal may be added directly to the laser current, so that the laser output, i.e., the optical carrier, is intensity modulated. In theory the bandwidth of the transmitted signal must be as broad as the bandwidth of the data signal. However, the resultant optical spectrum is more than twice as broad as the theoretical limit. Not only does the optical signal have double-sidebands, one below and one above the optical carrier, the intensity modulation also superimposes an unintentional frequency modulation, i.e., laser frequency chirp. Laser frequency chirp is modulation of the laser frequency caused by modulation of the refractive index of the laser cavity in response to current modulation The interaction of chirp and chromatic dispersion in the fiber can cause system impairments. Therefore, to avoid the effects of laser frequency chirp, externally-modulated optical fiber links are conventionally recognized as the preferred choice. By using an MZ external modulator it is possible to modulate an optical carrier so that the resulting optical spectrum does not have any excess chirp. See, id. F. Koyama and K. Iga, "Frequency chirping in external modulators". However, the optical spectrum will still have double-sidebands, and therefore, be twice as wide as the theoretical limit.

Figures 1, 2:
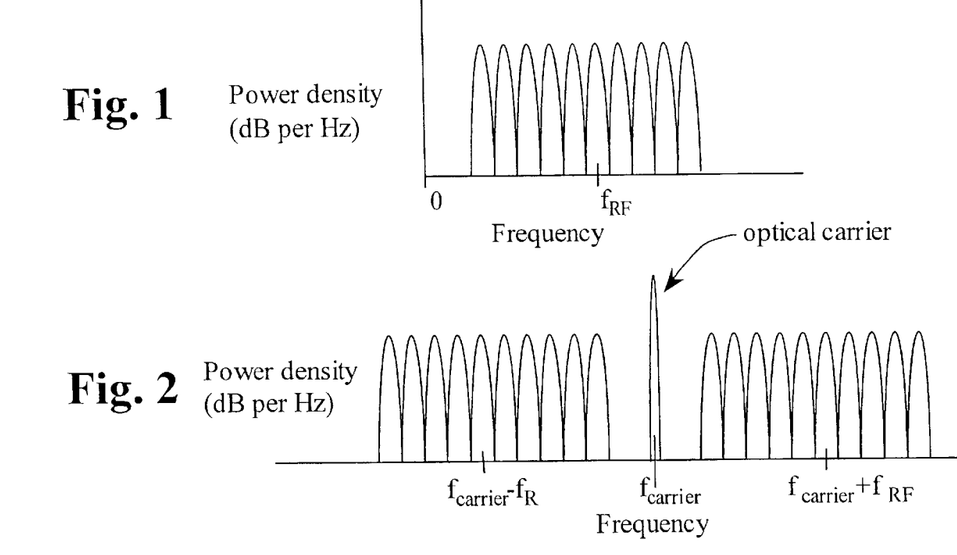
FIG. 1 illustrates the RF spectrum of data and FIGS. 2–3 illustrate the optical spectra that would result from using those data to modulate an optical carrier using conventional external modulation (FIG. 2) and single-sideband modulation (FIG. 3)

FIG. 1 shows schematics of radio frequency (RF) and optical spectra to illustrate these points. FIG. 1 shows the data signal used to modulate the optical carrier, in this example the data signal is made of multiple RF subcarriers (CATV signals are a good example of this sort of signal). FIG. 2 is a schematic of the spectrum of an externally modulated optical carrier. Note that it is twice as wide as the spectrum shown in FIG. 1.

Conventional intensity modulation creates signals with two sidebands around the optical carrier frequency. These two sidebands contain the same information. Because of optical fiber dispersion, different frequency components will travel at different speeds, creating interference in the transmitted signals. Although the two sidebands contain the same information, they travel at different speeds in the optical fiber and arrive at the receiver at different times. The net result is a power penalty and limit in the transmission distance. The greater the frequency separation the higher the penalty.

Optical transmission systems employing baseband digital transmission, e.g., by on/off keying of the light, may also suffer from the effects of dispersion. In long-distance transmission systems, dispersion can interact with non-linearities in the optical fiber, further impairing transmission.

All conventional fiber optic communication systems employ double-sideband modulation. To reduce the effects of dispersion it is preferable to either operate at wavelengths corresponding to low-fiber dispersion, or include dispersion compensation. Some optical fibers also suffer from polarization-mode-dispersion, which may vary with time due to strain and temperature variations. It is difficult to compensate for this sort of dispersion. In addition, some optical non-linearities, such as self-phase modulation, are worse in transmission systems with low dispersion. Therefore; there is a need for optical modulation techniques that are tolerant of dispersion.

Figure 4:
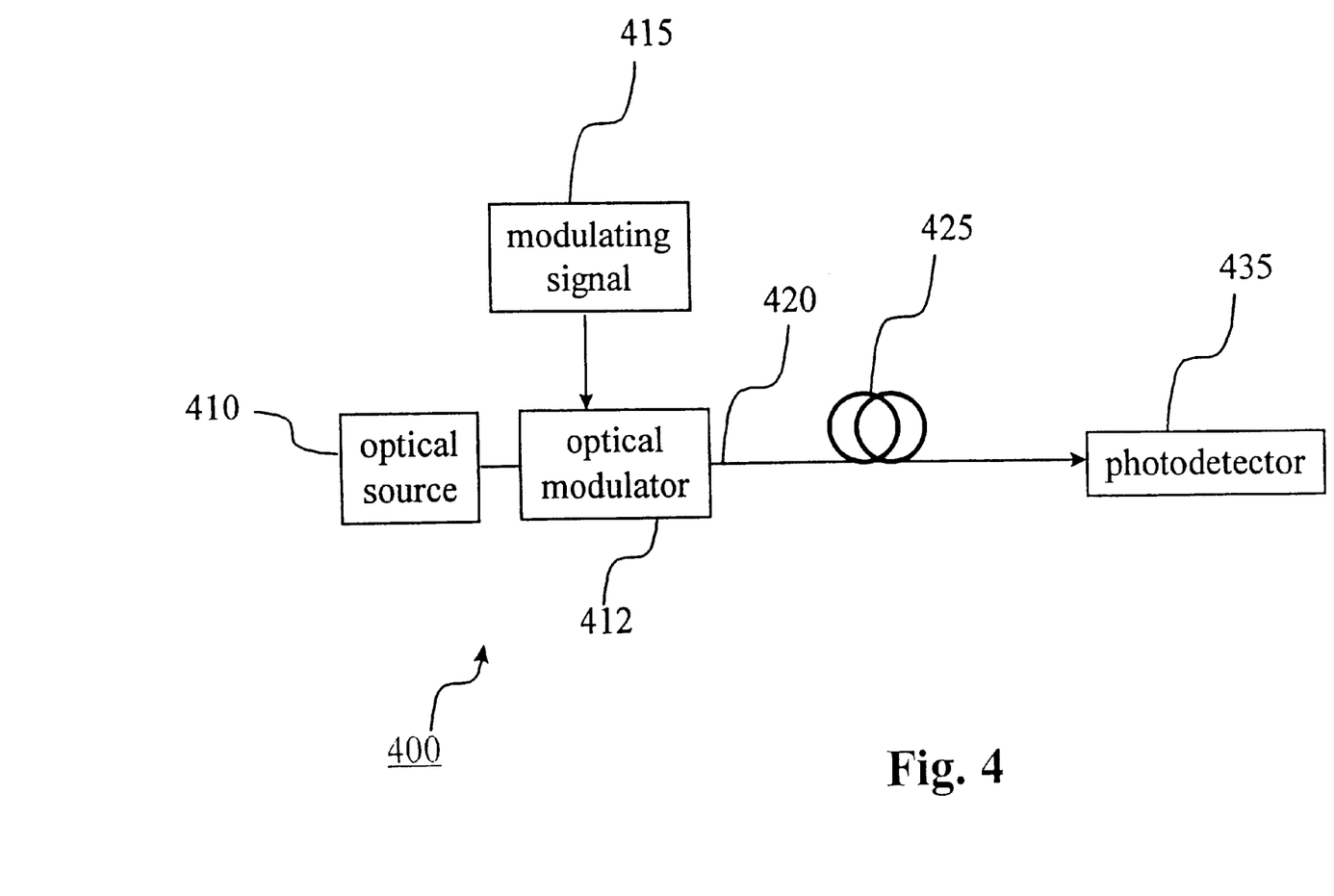
FIG. 4 illustrates a conventional optical data transmission system.

FIG. 4 shows a conventional fiber optic data transmission system 400. In the system 400, an optical carrier signal is emitted from optical source 410. The carrier signal is modulated by optical modulator 412, which is driven by a modulating signal 415, to generate an optical signal consisting of an optical carrier signal with double-sideband, DSB 420. However, when the DSB signal 420 is sent over fiber link 425, chromatic dispersion causes each spectral component to experience a different time delay depending on the length of the fiber link 425. The transmitted DSB signal 420 is received by a photodetector 435 coupled to the fiber link 425. This photodetector 435 converts the incident optical DSB signal 425 into current. The photodetector 435 generates a current corresponding to the received optical power $P_r$ which has a direct current part corresponding the average received optical power and an alternating current part which corresponds to the instantaneous optical intensity change due to modulation.

However, if the phase difference between the two optical sidebands at optical frequencies ($f_{carrier}+f_{RF}$) and ($f_{carrier}-f_{RF}$) received at the photodetector 435 is an odd multiple of π, the received signal from the upper sideband and the lower sideband will destructively interfere with each other, canceling out all the information power in the signal received by the photodetector 435 at $f_{RF}$. As the frequency $f_{RF}$ increases, the dispersion effect causes impairments at shorter transmission distances. As a result, the length of the fiber link 425 becomes severely limited. For example, when conventional single-mode fiber is employed, a 3-dB degradation in the detected RF power occurs in an externally modulated, 6 km link operating at 1.5 μm with a 20 GHz sub-carrier.

Therefore, chromatic dispersion can be a major factor limiting the maximum distance and/or bit rate of long haul fiber-optic systems that require relatively lengthy optical links. Dispersion compensation can mitigate these effects, but it adds to the system's complexity.

Figure 3:
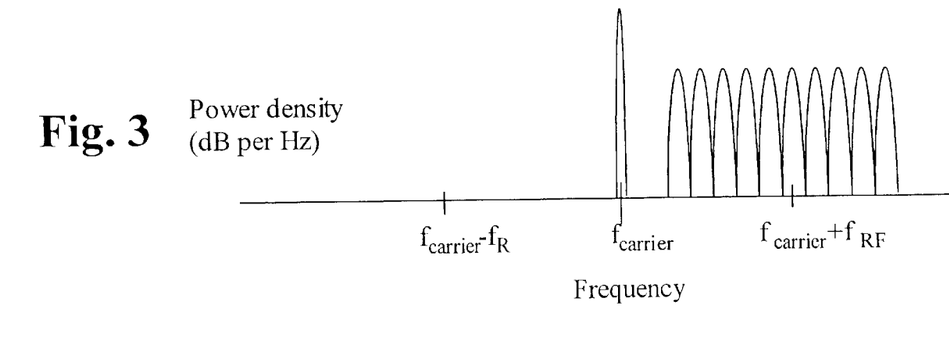

FIG. 3 shows an optical signal with single-sideband transmission. The transmission of single-sideband (SSB) signals has also been used in RF transmission systems to reduce the RF electromagnetic spectrum occupied by the signal by a factor of two. The use of optical SSB transmission also reduces the transmitted optical signal spectrum by a factor of two. The smaller the bandwidth used in transmission, the smaller the dispersion penalty in the transmitted signal. Therefore, because only half of the optical bandwidth is required, the dispersion suffered by an optical single-sideband signal is half of the same signal using double-sideband modulation. In an intensity modulated double-sideband optical transmission system, the detected signal is generated by mixing the two sidebands with the optical carrier in the transmitted spectrum shown in FIG. 2. The down-converted signal has components from both the upper and lower sidebands.

However, the relative delay between different corresponding frequency components in the upper sideband and the lower sideband are different, although they represent the same information, making it difficult to compensate for optical fiber dispersion in the electrical domain. In contrast, in an optical single-sideband transmission system, the detected baseband signal is generated in the photodetector by mixing the optical carrier signal with only one sideband. Therefore, the relative arrival times of the various signal frequency components are preserved in the electrical output signal resulting from photodetection. As a result, the dispersion effect due to the transmission fiber link can be compensated in the electrical domain after photodetection. Such compensation is advantageous because electrical compensation can be done using microwave delay lines which are much more compact than dispersion compensation fiber.

The most obvious method for generating optical SSB signals is to use an optical filter to suppress one of the sidebands. However, this method is limited by the characteristics of optical filters—currently available optical filters are not sufficiently sharp to be used to generate single-sideband signals when the modulating signal has low-frequency content.

Alternatively, it is also known to generate an optical transmission signal with SSB modulation rather than filtering out one of the sidebands. See, M. Sieben, J. Conradi, D. Dodds, B. Davies and S. Walklin, "10 Gbit/s optical single sideband system", Electronics Letters, May 22, 1997, pp. 971–3. In such a scheme, light from a laser is modulated using an MZ intensity modulator, with the two sides of the modulator driven in such a way as to create a single-sideband, intensity-modulated output. Thus, if m(t) is the input data, and H(m(t)) is an approximation of the Hilbert transform of m(t), then one side of the modulator is driven with m(t)+H(m(t))−$V_\pi$/4, and the other side is driven with −m(t)+H(m(t))+$V_\pi$/4, where $V_\pi$ is the voltage required to induce a π phase shift to the optical signal in each arm of the MZ interferometer. To a first order, the signal generated by such a modulation system is a good approximation of the single-sideband optical signal.

However, although this alternative scheme is more practical because no optical filtering is required, it does not work well for low-frequency information, owing to the imperfection of the response of a practical Hilbert transformer in the low-frequency region. As a result, the lower-frequency components of the optical signal still have sidebands on both sides of the optical carrier signal.

SUMMARY OF THE INVENTION

The present invention solves the deficiencies of the conventionally known SSB systems and methods for generating and transmitting optical SSB signals by line-encoding the input data before generating the optical SSB signal. Byline coding the input data, the low-frequency portion of the transmitted signal is removed, reducing the non-ideal effects of a practical Hilbert Transformer.

Such a technique improves a fiber-optic system's dispersion tolerance, including polarization-mode dispersion. In addition, such an improvement in spectral efficiency leads to increased fiber-optic system capacity and longer transmission distance.

These and other features and advantages of this invention are described in, or are apparent from, the following description of the apparatus/systems and methods according to this invention.

BRIEF DESCRIPTION OF THE DRAWINGS

The benefits of the present invention will be readily appreciated and understood from consideration of the following detailed description of the exemplary embodiments of this invention, when taken with the accompanying drawings, in which same numbered elements are identical and.

DETAILED DESCRIPTION OF EXEMPLARY EMBODIMENTS

Figure 5:
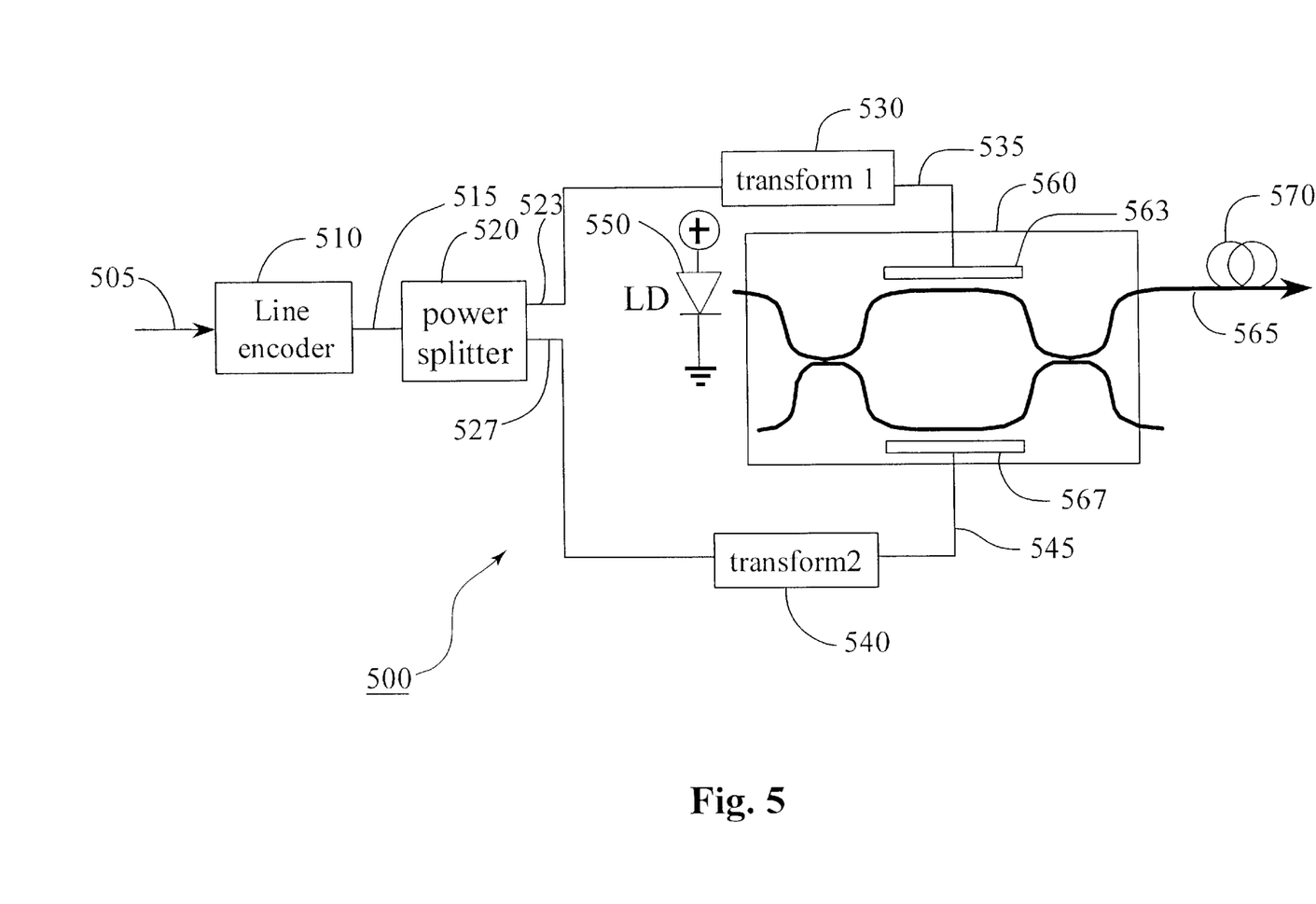
FIG. 5 illustrates an optical data transmission system in accordance with a first exemplary embodiment of the invention.

The first through third exemplary embodiments of the invention provide a transmission system that use, for example, an MZ modulator, such as a commercial dual-electrode, traveling-wave modulator. As shown in FIG. 5, in accordance with the first exemplary embodiment of the invention, the transmission system 500 includes a line encoder 510, a power splitter 520, a first transform mechanism 530 and a second transform mechanism 540, a light source 550, an MZ modulator 560 and the transmission optical fiber 570. The line encoder 510 is coupled to the power splitter 520. The power splitter 520 is coupled to the first and second transform mechanisms 530 and 540. The first and second transform mechanisms are coupled to the MZ modulator 560. The modulator 560 is also coupled to the light source 550 and the transmission fiber 570.

A baseband data signal 505 is input to the system 500 and is line coded using the line encoder 510, which generates an encoded data signal 515 with little low-frequency content. The line-encoded data signal 515 is then fed through the power splitter 520 to produce two identical RF data signals 523 and 527, both of which are represented by m(t). The RF signal 523 is fed through a first transform mechanism 530 to produce a first modulating signal 535, according to the relationship $m(t)+H(m(t))-V_\pi/4$. The RF signal 527 is fed through a second transform mechanism 540 to produce a second modulating signal 545, according to the relationship $-m(t)+H(m(t))+V_\pi/4$.

The generation of such modulations requires the Hilbert transformation H(●) be performed on the incoming signals 523 and 527 to the MZ modulator 560. The transformed modulating signal 535 is used to drive the first arm of the MZ modulator 560 through an electrode 563. The transformed optical signal 545 is used to drive the second arm of the MZ modulator 560 through another electrode 567. That is, the modulator 560 has two independent drive electrodes 563 and 567 to allow simultaneous injection of the two the transformed modulating signals 535 and 545.

Using the two modulating signals 535 and 545, the modulator 560 modulates the light produced by the optical source 550 to produce a single-sideband optical output signal 565. The light source 550 may be a laser diode or any other similar device capable of generating a single wavelength optical carrier.

The MZ modulator 560 usually has insertion losses between 4 and 10 dB, a modulation bandwidth greater than a few, e.g., 3 gigahertz (GHz), and a switching voltage $V_\pi$ near 5 volts. The phase shift on the optical carrier in each arm of an MZ modulator is proportional to the applied voltage on the respective arm. The output intensity of these modulators is a sinusoidal function of the voltage difference applied across the two electrodes of the modulator. By pre-biasing to 50% transmission, small-signal modulation applied to the MZ modulator 560 results in an approximately linear intensity modulation. This bias point, which corresponds to the point of inflection in a corresponding sinusoidal transfer function, produces zero second-order distortion. However, the corresponding third-order distortion is worse than a typical directly-modulated DFB laser.

The single-sideband output signal 565 is output to the transmission fiber link 570. The transmission fiber link 570 then carries the optical single-sideband signal to a photodector at the receiver, not shown, which is at the far end of the transmission fiber link.

As explained above, the modulating signals 535 and 545 contains the Hilbert transform of the encoded signal 523 and 527. A Hilbert transformer basically adds a 90° phase shift to the input signal.

Figure 6:
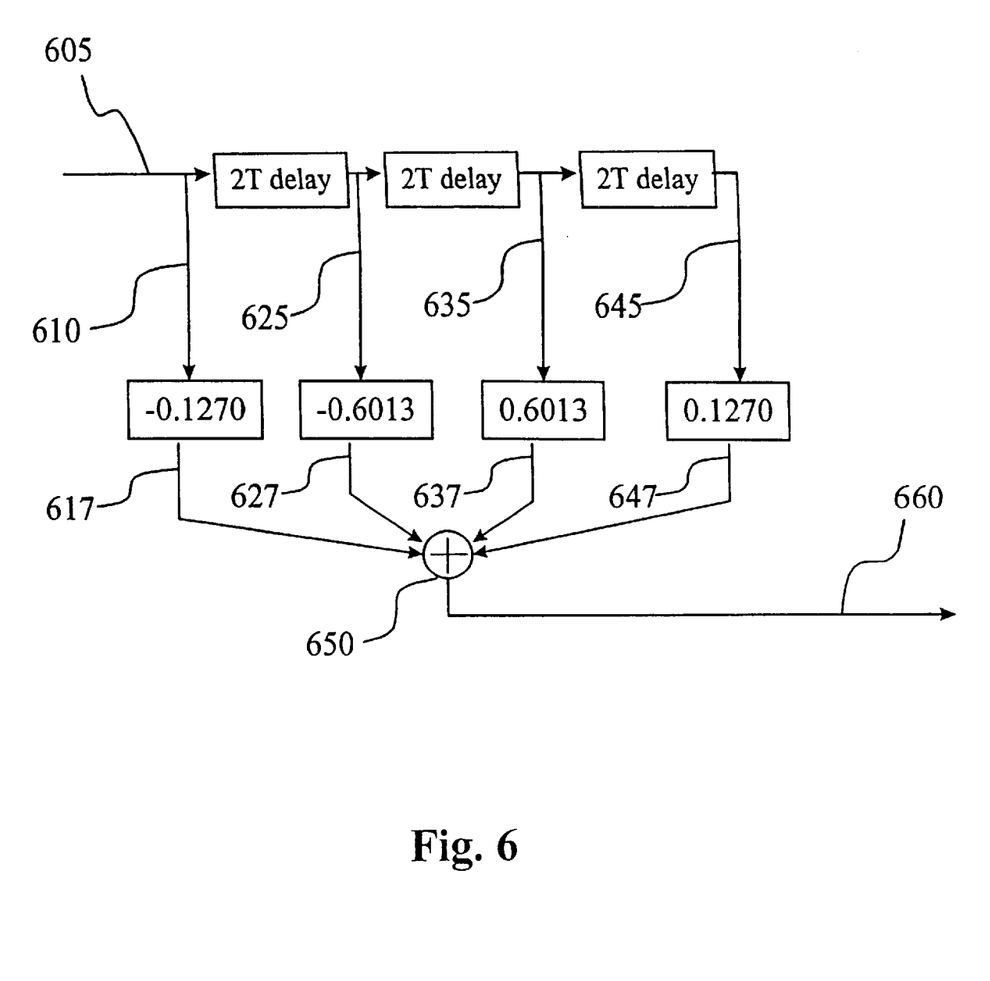
FIG. 6 is a schematic diagram illustrating a transform of signal components in that approximate a Hilbert transformer.

FIG. 6 shows a schematic diagram of a possible implementation of a Hilbert transformer. As shown in FIG. 6, input signal 605 is input into the schematic circuit and various intermediate signal components 610, 625, 635, 645 are copies of the input signal 605 but delayed by a time period of 0, 2T, 4T and 6T respectively with respect to input signal 605. Here, T=1/(2×signal bandwidth) is the Nyquist sampling period of the input signal 605. The delays can be produced by using microwave-delay lines of proper lengths.

Subsequently, each of the signals 610, 625, 635, 645 are multiplied by a weighting factor, easily computed for the purpose of performing a Hilbert transform. The resulting quantities 617, 627, 637, 647, respectively, are summed together by a combiner 650 and output as output signal 660.

The values of the weighting factors correspond to coefficients in a tapped-delay line-filter used to approximate a Hilbert transformer. Practically, each weighting factor can be generated using a variable-gain microwave amplifier. An inverting or non-inverting amplifier is used if the coefficient has a negative or positive value. It should be appreciated that FIG. 6 shows a seven-stage tapped-delay line filter.

Practically, to approximate a Hilbert transformer with an N stage tapped-delay line filter, if N is odd, then all of the odd filter coefficients are zero. Therefore, FIG. 6 only illustrates four stages, corresponding to the four even coefficients $C_0$, $C_2$, $C_4$ and $C_6$. These values are optimized values taken from L. R. Rabiner & R. W. Schafer, "On the behavior of Minimax FIR Digital Hilbert Transformers", Bell System Technical Journal, Vol. 53, No. 2, pp. 363–391, February 1974. The above paper also explains how to compute the optimum coefficients of tapped-delay line Hilbert transformers in great detail, and tabulates the optimum values under various scenarios. It should be realized that the greater the number of tapped-delay line stages used, the better the theoretical approximation of the Hilbert transform function. However, practical implementation complexity, cost, amplifier noise and distortion may limit the actual number of stages used.

Figure 7:
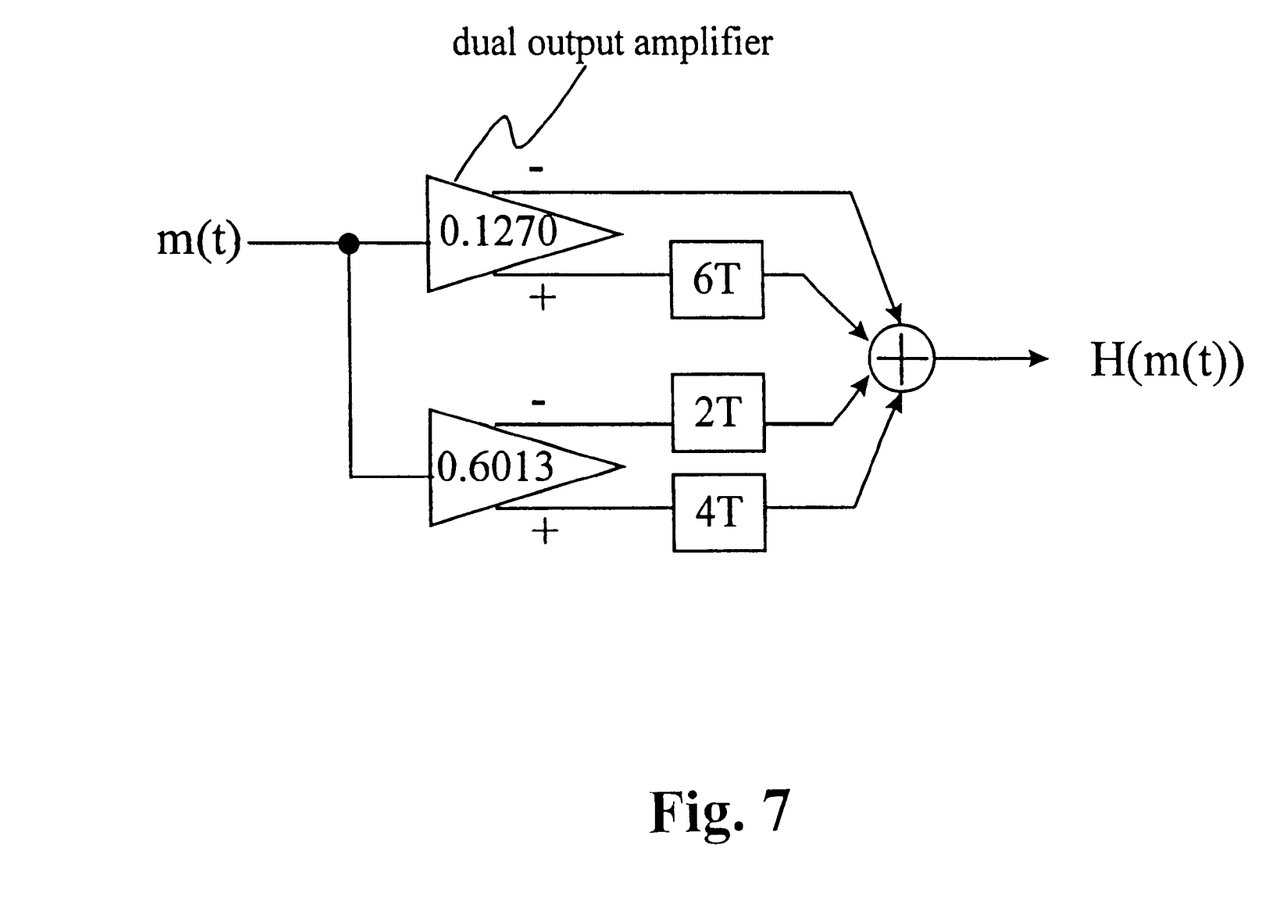
FIG. 7 is a circuit diagram corresponding to the schematic diagram shown in FIG. 6.

FIG. 7 shows another implementation of a Hilbert transformer equivalent to the one given in FIG. 6. Careful readers will notice that in FIG. 6, the weighting coefficients are symmetric in value about the center tap in FIG. 6, except that they are differing in sign. Since FIG. 6 is a linear system, one can change the order of time delay and weighting coefficients which represent multiplications without affecting the result. Consequently, we can use dual-output amplifiers to produce equal but opposite sign coefficients, and introduce proper delay lines afterwards, as in FIG. 7.

Figure 8:
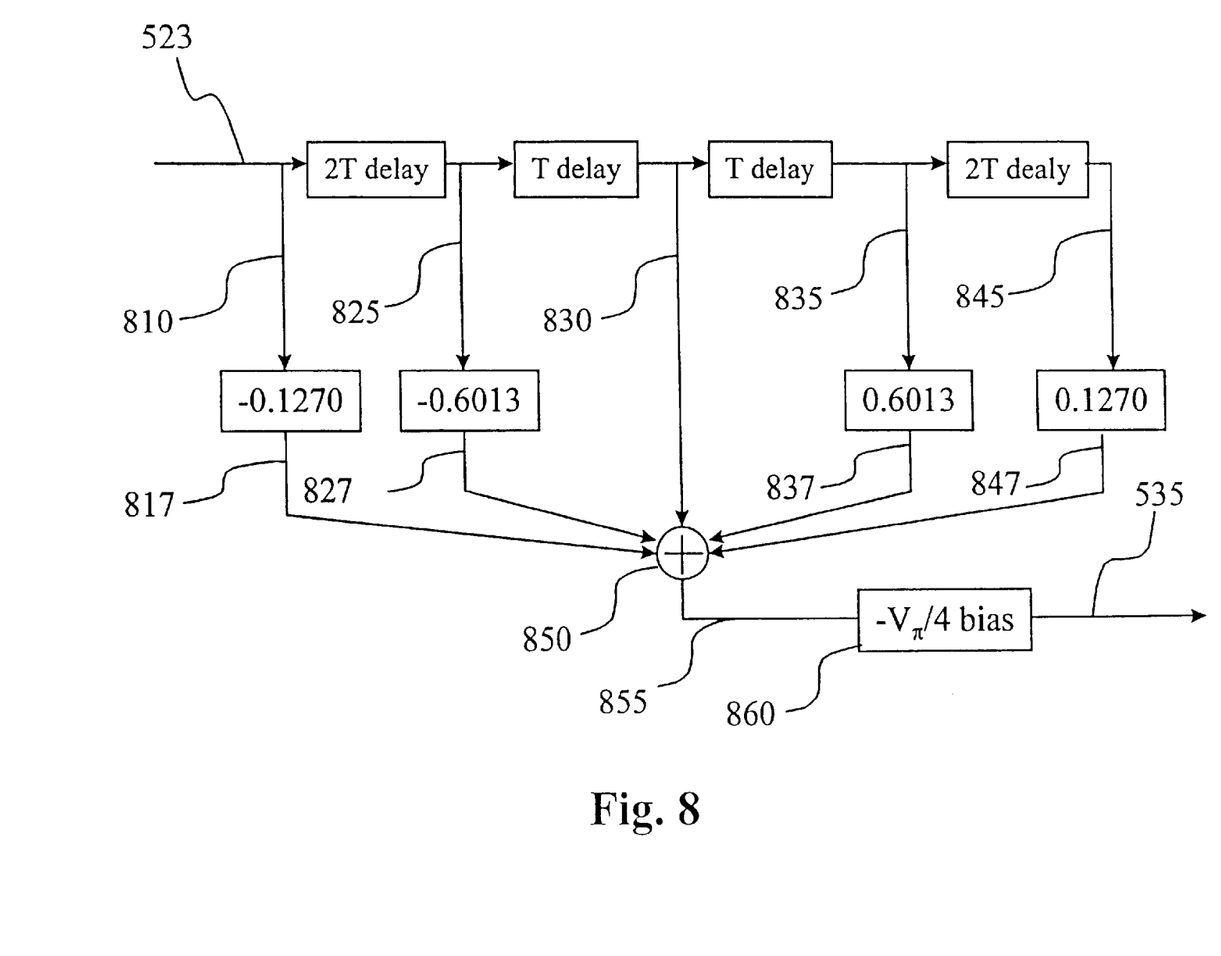
FIG. 8 is a schematic of the drive circuitry for one side of the MZ modulator.

FIG. 8 describes an implementation of transform 1, which is shown as 530 in FIG. 5, using the Hilbert transformer illustrated in FIG. 6. In FIG. 8, the middle tap of 2T time delay in FIG. 6 is divided into two separate taps of delay T. The signal copy m(t), shown as signal 830 in FIG. 8, is added to the its own Hilbert transform from the center of the tap-delay line network, to yield the output 855. A DC bias voltage of $-V_\pi/4$ is added to the output 855. The output from the circuit shown in FIG. 8 produces the output 535 of transform 1, which is described as $m(t)+H(m(t))-V_\pi/4$.

The circuit generating transform 2, which is shown as 540 in FIG. 5 and described by $-m(t)+H(m(t))+V_\pi/4$, can be similarly constructed.

Additionally, an experienced person can also easily construct similar circuit structures for transform 1 and transform 2 based on the Hilbert transformer structure shown in FIG. 7.

Figure 9:
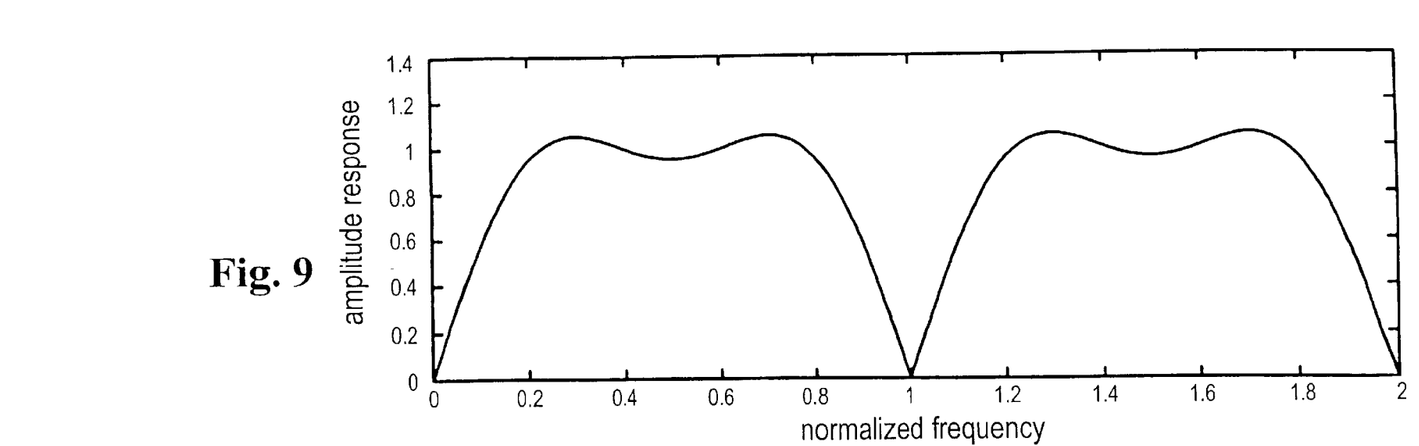
FIG. 9 illustrates the amplitude response of a signal output from the Hilbert transformer in FIG. 6 or FIG. 7.
Figure 10:
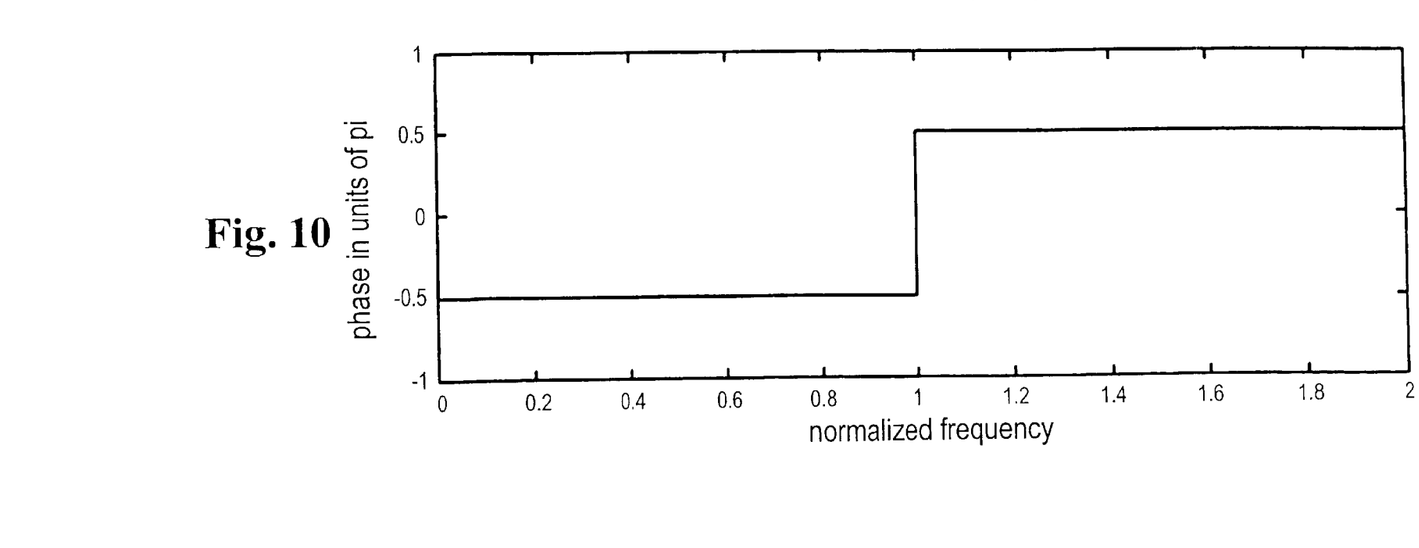
FIG. 10 illustrates the phase response of the signal output from the Hilbert transformer in FIG. 6 and FIG. 7.

FIGS. 9 and 10 show the amplitude and phase responses of the output signal 660 with respect to the input signal 605 delayed by 3T, illustrated in FIG. 6, using the set-ups shown in FIGS. 6 or 7. The responses are plotted in frequencies normalized to the Nyquist sampling rate 1/T. As shown in FIGS. 9 and 10, although it is possible to provide a 90° phase shift throughout the whole spectrum, the signal power is significantly attenuated for some portion of the spectrum. More specifically, amplitude response falls far below unity for the lower-frequency portion of the signal spectrum. Therefore, the operation of the Hilbert transformers shown in FIGS. 6 and 7 produce unwanted attenuation, resulting in incomplete cancellation of the low-frequency components in the unwanted sideband of the generated single-sideband spectrum, i.e., for those components near the optical carrier there is incomplete cancellation. This residual low-frequency sideband can increase the dispersion penalty and interference with other nearby channels.

An ordinary on-off keyed baseband digital input signal usually has significant spectral content in the low-frequency region. As a result, the Hilbert transformers illustrated in FIGS. 6 and 7 will not work well with an ordinary on-off keyed signal because of their inefficiency in the low-frequency region.

To improve the overall system performance, line coding is performed on the raw data to remove the low-frequency content in the signal spectrum. There are various methods to line encode the signal. In the exemplary embodiments of the invention, line encoders encode input data to remove the low-frequency content. Specifically, in the first exemplary embodiment, the line encoder 510 line encodes input data signal 505 using, but not limited to, 8B/10B line coding, which is a standard coding for Gigabit Ethernet. See, IEEE Standard 802.3 z.

8B/10B encoding replaces eight-bit words with ten-bit words according to certain prescribed rules. Such encoding basically replaces long strings of 0's and 1's, e.g. data words 00000000 and 11111111 etc., which correspond to the low-frequency spectral contents with alternating 0's and 1's. As a result of such a replacement, the data transmission rate of the system must be increased accordingly. Thus the 8B/10B encoding scheme introduces an overhead of 25% in terms of bandwidth usage.

Figure 11:
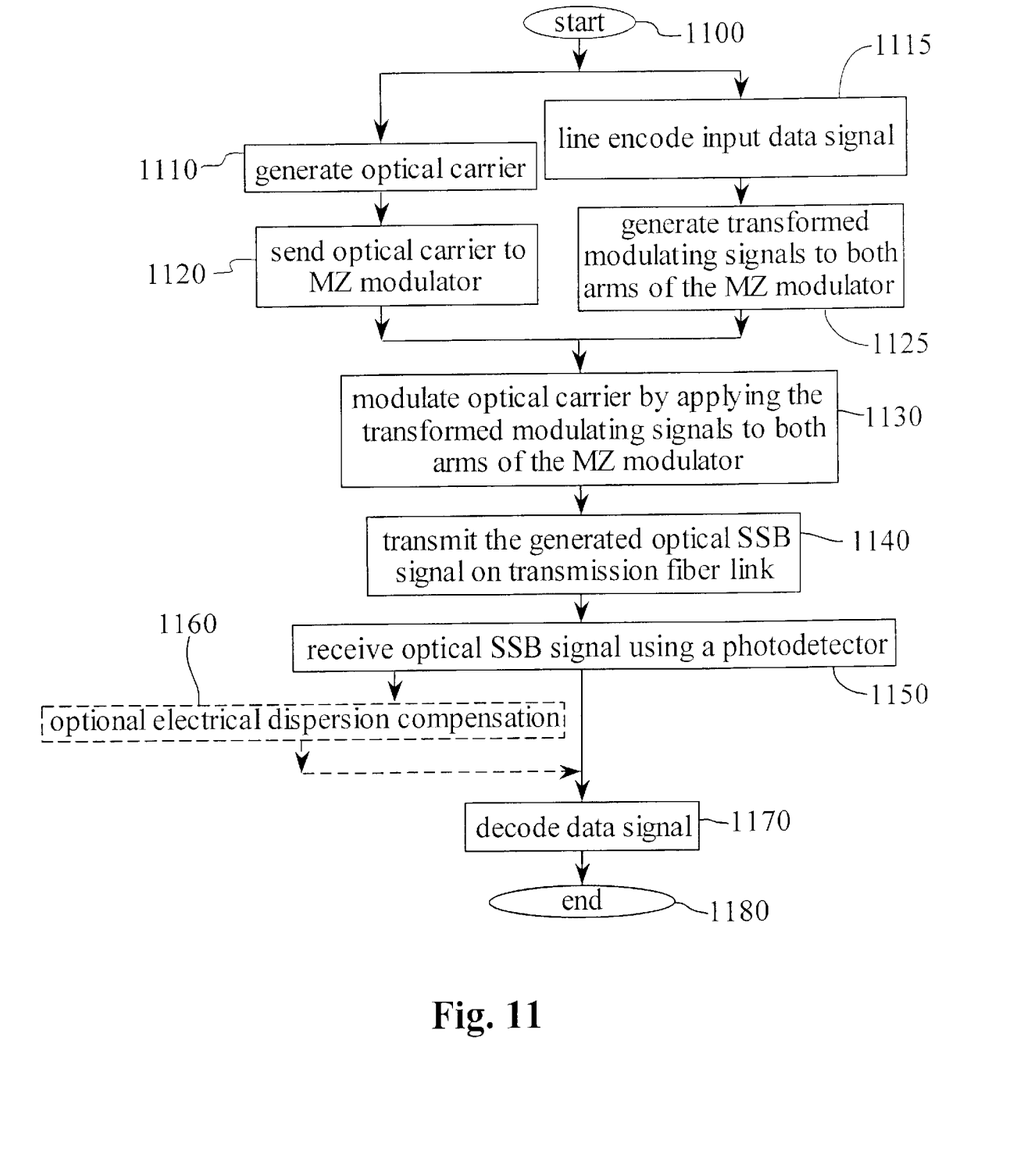
FIG. 11 is a flowchart illustrating a method for transmitting optical data in accordance with the exemplary embodiments of the invention.

FIG. 11 is a flowchart illustrating a method for transmitting optical data in accordance with the exemplary embodiments of the invention. As shown in FIG. 11, the method begins in step 1100 and proceeds to step 1110. In step 1110, the optical carrier is generated e.g., by a laser diode. Step 1110 proceeds in parallel with step 1115, where the data signal is line encoded, e.g., with 8B/10B code. Step 1110 then proceeds to step 1120 in which the optical carrier is input to a dual arm MZ modulator. Step 1115 proceeds to step 1125 in which two transformed modulating signals are produced by the appropriate tapped-delay line filters. The results of steps 1120 and 1125 are combined at step 1130 when the transformed modulating signals produced in step 1125 are applied to the two arms of the MZ modulator to modulate the input optical carrier generated in step 1120, producing the optical single-sideband transmitted signal. Control then proceeds to step 1140, in which the optical single-sideband signal generated is transmitted down the transmission fiber link. Control then proceeds to step 1150. In step 1150, the transmitted signal is detected by a photodetector. The method optionally may proceed to step 1160, in which dispersion compensation is performed on the received optical signal in the electrical domain. However, this step may or may not be necessary. Therefore, control may proceed directly to step 1170, in which the received single-sideband optical signal is decoded. Subsequently, control proceeds to step 1180, in which the method ends.

Figure 12:
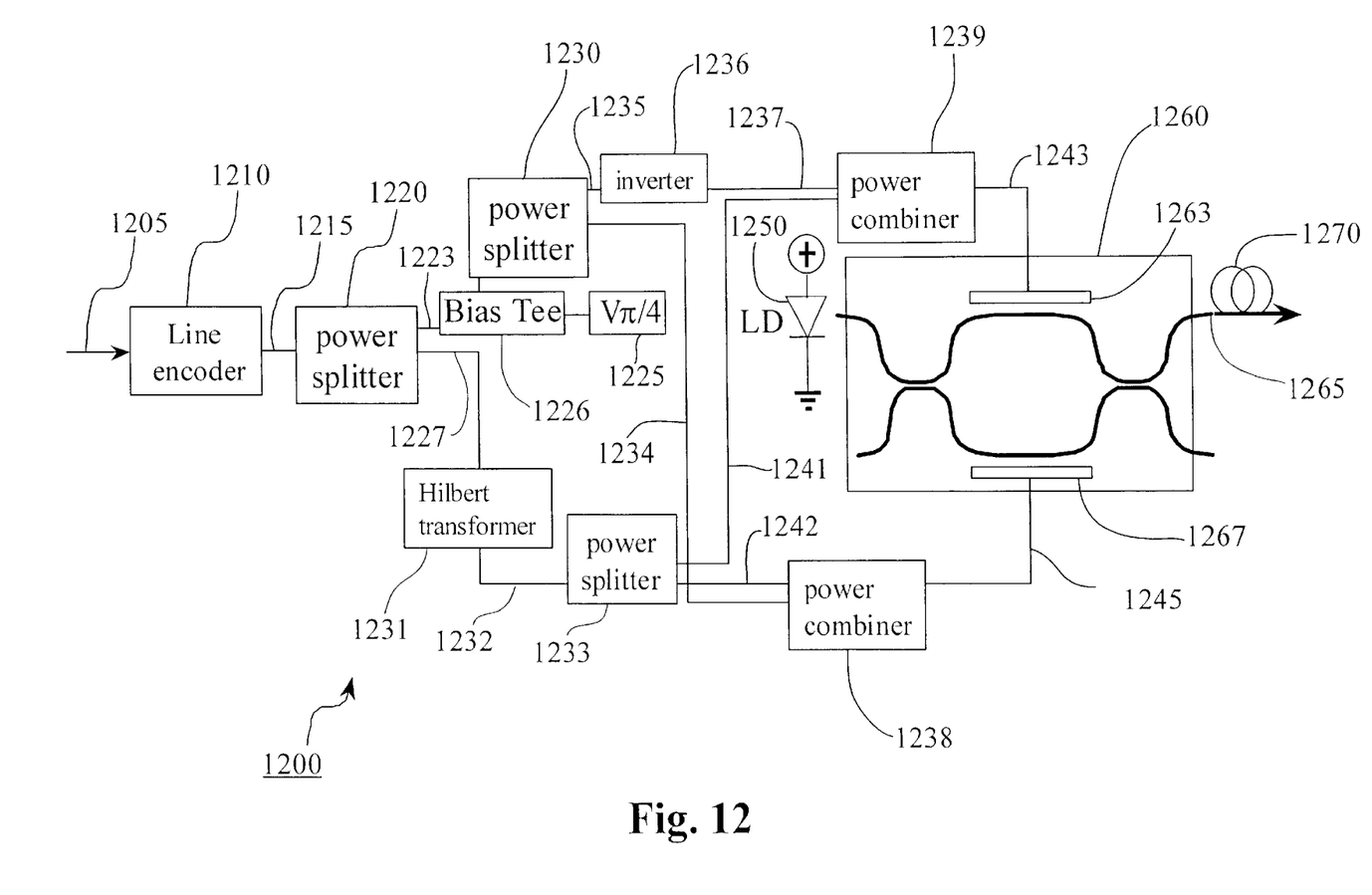
FIG. 12 illustrates an optical data transmission system in accordance with a second exemplary embodiment of the invention.

FIG. 12 describes a second exemplary embodiment of the invention, wherein the Hilbert transform needs to be generated only once. As shown in FIG. 12, the transmission system includes a line encoder 1210, power splitters 1220, 1230 and 1233, a Hilbert transform mechanism 1231, and power combiners 1238 and 1239, a light source 1250, an MZ modulator 1260 and the transmission optical fiber 1270. The line encoder 1210 output 1215 may be represented as m(t), it is coupled into the power splitter 1220. Output 1223 of power splitter 1220 is coupled into a bias-tee 1226, and DC voltage $-V_\pi/4$ is added to the signal. The combined signal is sent to another power splitter 1230. The outputs of power splitter 1230 are identical signals 1234 and 1235 that are represented as $m(t)-V_\pi/4$. The other output signal 1227 of power splitter 1220 is sent to Hilbert transform mechanism 1231. The Hilbert transform mechanism 1231 may be constructed as shown in FIG. 7. Output signal 1232 of the Hilbert transform mechanism 1231 may be represented as H(m(t)). The output signal 1232 is sent to the power splitter 1233. The output signals 1241 and 1242 of power splitter 1233 are sent to power combiners 1239 and 1238, respectively. In power combiner 1238 signals 1242 and 1234 are combined; the output signal 1245 of the power combiner 1238 may be represented $m(t)+H(m(t))-V_\pi/4$.

The output signal 1235 of the power splitter 1230 is coupled to an inverter 1236. Inverter 1236 maybe an inverting amplifier. In an alternative implementation, power splitter 1230 and inverter 1236 are made out of a single dual output amplifier where one of the two output signals is inverted. Signal 1237 may be represented: $-m(t)+V_{\pi/4}$. Signal 1237 is sent to the power combiner 1239. In another alternative implementation, 1236 and 1239 are made out of a single differential amplifier that inverts signal 1235. In power combiner 1239, signal 1237 is combined with signal 1241, producing a signal 1243 that may be represented $-m(t)+H(m(t))+V_\pi/4$. This is equivalent to the output of the second transformer 540 in FIG. 5.

Figure 13:
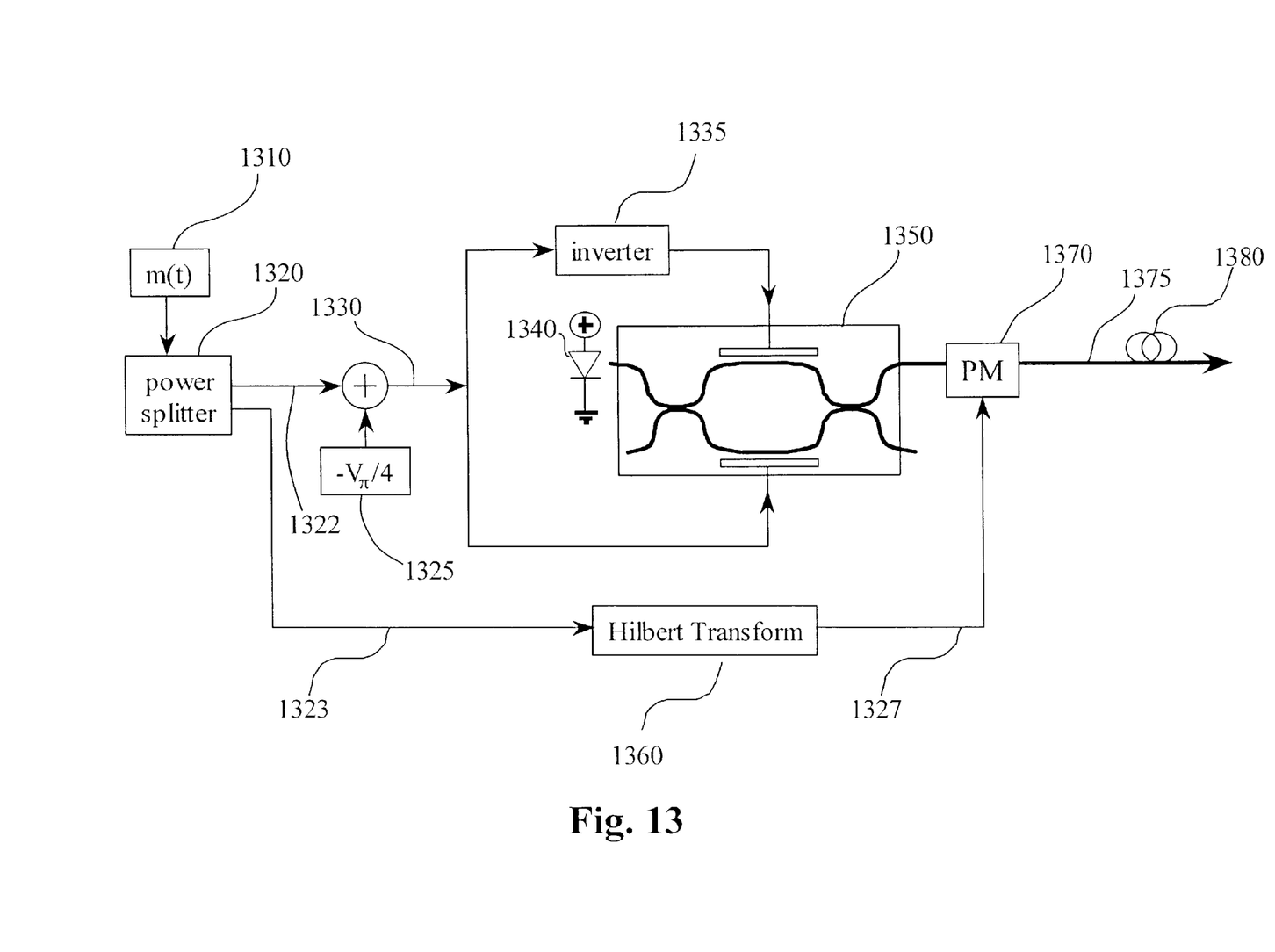
FIG. 13 illustrates an optical data transmitter in accordance with a third exemplary embodiment of the invention.

It is also possible that one can use a combination of a dual drive MZ modulator and a phase modulator to generate single side band optical modulation. FIG. 13 illustrates the setup for achieving this purpose in accordance with a third exemplary embodiment of the invention. Here, the line coded signal m(t) 1310 is split into two identical halves by the power splitter 1320. One half of the signal 1322 is added with a bias signal 1325 of magnitude $-V_\pi/4$. The combined signal 1330 is used to differentially modulate the MZ modulator 1350. In actuality, one can also more conveniently use a single input MZ modulator that automatically takes care of differentially modulating the two arms internally. Another half of the signal 1323 is input to a Hilbert transformer 1360 to generate the H(m(t)) 1327. Signal 1327 is used to modulate the phase modulator 1370, which follows the MZ modulator 1350. The output 1375 from the phase modulator 1370 is the single-sideband optical signal to be transmitted down the transmission fiber 1380 and received at the far end.

Figure 14:
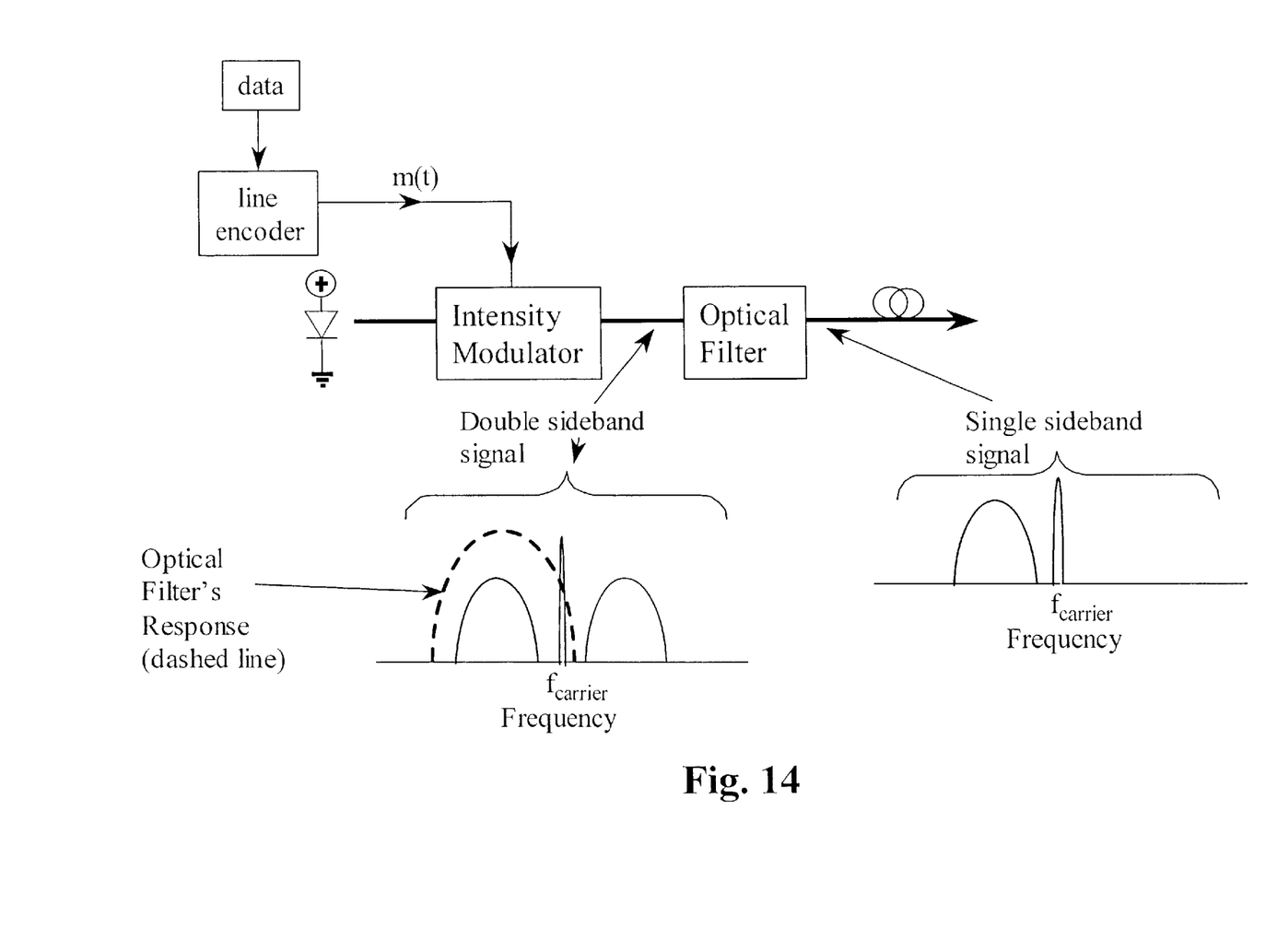
FIG. 14 illustrates an optical data transmitter in accordance with a fourth embodiment of the invention.

Finally, optical filters are feasible and will soon become commercially available that are sufficiently sharp to eliminate one sideband of a conventional double-sideband signal. As depicted in FIG. 14, the fourth exemplary embodiment of the invention, utilizes such optical filters. The resulting signal has a single-sideband. It is preferable that line-coding is performed to improve performance, as data at low-frequencies may be compromised by light at optical frequencies near the optical carrier leaking through the filter. Because this light passes through the filter's edge, it will undergo a phase shift, which may cause it to impair the received signal, as it will be combined with the signal carried by the light near the optical carrier, but different from the desired sideband.

While this invention has been described in conjunction with the specific embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

For example, it is foreseeable that the MZ intensity modulator would be replaced by two parallel optical intensity modulators (such as two MZ electro-absorption modulators) that are coupled between a pair of 1×2 or 2×2 3-dB optical couplers. Moreover, any device that is capable of performing intensity modulation in a manner similar to the MZ intensity modulator, may be used.

The weighting coefficients can be implemented in an analog way using microwave amplifiers as described in this embodiment. However, they can also be implemented digitally when the processing speed of microprocessors becomes fast enough to process signals at optical data signal speed.

Additionally, it is foreseeable that other types of coding'schemes may be used by the line encoders 540 and 1210 to shift the spectral location of the transmission data away from the baseband. For example, the encoding may perform Manchester encoding rather than 8B10B. Manchester encoding is a synchronous encoding technique used by the traditional IEEE 802.3a 10-base 2 Ethernet protocol in the physical layer to encode the clock and data of a synchronous bit stream. In this technique, the actual binary data to be transmitted over the cable are not sent as a sequence of logical levels of 1's and 0's (known technically as Non Return to Zero (NRZ)). Instead, the bits are translated into a slightly different format that has a number of advantages over using straight binary encoding, i.e., NRZ.

What is claimed is:

1. A method for generating an optical single-sideband data signal, the method comprising the steps of:

generating an optical carrier signal;

encoding an input data signal to produce an encoded data signal m(t), wherein said encoding step removes low frequency content from said input data signal by selectively replacing a first set of digital values with a second set of digital values based on a set of encoding rules;

transforming said encoded data signal m(t) using an approximation of a Hilbert transformation to generate a transformed signal Hm(t); and modulating the optical carrier signal based on said encoded data signal m(t) using an optical single-sideband modulating device to produce said optical singlesideband data signal.

2. The method of claim 1, wherein the step of encoding includes 8B/10B encoding.

3. The method of claim 1, wherein said step of modulating further comprises the step of:

modulating the optical carrier signal based on both said encoded data signal m(t) and said transformed signal Hm(t) using said optical single-sideband modulating device to produce said optical single-sideband data signal.

4. The method of claim 1, wherein said step of modulating further comprises the steps of:

modulating the optical carrier signal based on said encoded data signal m(t); and filtering said modulated optical signal to produce an optical single-sideband signal.

5. The method of claim 1, wherein said step of modulating further comprises the step of:

using a Mach-Zehnder modulator to perform said step of modulating.

6. An optical modulator for generating an optical single-sideband data signal, the system comprising:

an optical carrier signal generator;

an encoder that encodes an input data signal to remove low frequency content signal by selectively replacing a first set of digital values with a second set of digital values based on a set of encoding rules from said input data signal to produce an encoded data signal m(t);

a transformer for transforming said encoded data signal m(t) using an approximation of a Hilbert transformation to generate a transformed signal Hm(t); and an optical single-sideband modulating device, coupled to the optical carrier signal generator and the encoder, that modulates the optical carrier signal based on the encoded data signal m(t) to produce said optical single-sideband data signal.

7. The modulator of claim 6, wherein the encoder uses 8B/10B encoding.

8. The modulator of claim 6, wherein said optical single-sideband modulating device also uses said transformed signal Hm(t) to generate said optical singlesideband data signal.

9. The modulator of claim 6, wherein said optical single-sideband modulating device includes an optical filter.

10. The modulator of claim 6, wherein said optical single-sideband modulating device is a Mach-Zehnder modulator.

* * * * *